United States Patent Office 3,822,112
Patented July 2, 1974

3,822,112
DYEING LIVE HUMAN HAIR WITH AN AQUEOUS SOLUTION OF A DIRECT DYE, 2-PHENOXY-ETHANOL AND ETHYL GLYCOL ACETATE
Charles Zviak, Franconville, and Giuliana Ghilardi, Paris, France, assignors to Societe Anonyme dite: L'Oreal, Paris, France
No Drawing. Filed June 26, 1969, Ser. No. 836,986
Int. Cl. A61k 7/12
U.S. Cl. 8—10.1
1 Claim

ABSTRACT OF THE DISCLOSURE

Live human hair is dyed by applying thereto a hair dye composition comprising an aqueous solution of a direct dye, 2-phenoxyethanol and ethyl glycol acetate.

A prior patent owned by applicants' assignee relates to a method of cold dyeing living hair and other keratinic fibers by means of direct dyes having little or no affinity for the keratinic fibers, by using with the customary hair dye composition alcohols which are soluble in water and which have the sole function of facilitating the transfer of the dye from the aqueous solution onto or into the hair to be dyed. These alcohols are chemically inert with respect to the dye and the keratinic fiber, are completely miscible in water in the proportion in which they are added, and respond to the general formula:

$$R-(O-CH_2CH_2-)_nOH$$

in which R represents an aliphatic hydrocarbon having a straight or branched chain and comprising at most 8 carbon atoms, and $n$ is a whole number between 1 and 4 inclusive.

We have discovered that it is possible to use under the same conditions solvents that are not completely soluble in water but are used in quantities up to the limit of their solubility in water having the general formula:

$$Ar-(O-CH_2-CH_2-)_nOH$$

in which $n$ is a whole number between 1 and 4 inclusive, and Ar is an aromatic radical—and preferably phenyl. Among the preferred solvents having the above formula is 2-phenoxyethanol.

The solvents of this invention may be used alone or in mixtures, in particular with a "primary solvent," that is a solvent already mixed with water before introduction of the solvent of this invention, this primary solvent being entirely miscible in water. The simultaneous presence of these two solvents in the water increases the efficacy of each of them. The proportions of the solvents used in such mixtures are as follows: 0.5% to 8% for solvents according to the invention, and 3.5 to 12% for the primary solvents.

Representative suitable primary solvents are Butyl Cellosolve and ethylglycol acetate.

Experience has shown that when hair is dyed using the solvents according to the invention, the resulting color of a specific dye is clearly deeper than with the solvents previously employed, such as arylalkyl alcohols, such as benzylic alcohol or phenylethyl alcohol, and slightly deeper than that obtained when $R-(O-CH_2CH_2)OH$ is used. It may be said that, in general, the dye colors made with 2-phenoxyethanol are much better than those made with other alcohols and acetones. Moreover, one can use them in lower concentrations to obtain the same color depth. The maximum concentrations of the aromatic solvents being 8%, while it is necessary to use concentrations in the order of 15% for example with 2-butoxy-2-ethanol.

The solvents according to the invention may be used with a large number of dyes, such as the nitro dyes, the azo dyes, the anthraquinone dyes, pigments which are insoluble in water, basic dyes, and especially those sold under the trademark "Janus" by the Bayer Co., complex metalliferous dyes, especially those sold under the following trademarks:

"Irgalane" (J. R. Geigy, A.G.),
"Lanazyne" (Sandoz, S. A.),
"Carbolan" (Imperial Chemical Industries, Ltd.),
"Cibalane" (Ciba), as well as "Nigrosine" dyes and "Induline" dyes.

Several embodiments of the invention will now be described, the proportions being given by weight in grams.

EXAMPLE 1

The following mixture is prepared:

Isolan Olive BL (Bayer)—C.I. Acid Green 65, Color Index, 2d ed., 1956, supp. 1963, S92 which is a monoazo metal dye complex _____ 0.5
Butyl Cellosolve _____ 5
2-phenoxyethanol _____ 1
Water, q.s.p. 100 cc.
pH 3.

The mixture, when applied to bright chestnut hair, imparts a greenish bronze glint thereto after 20 minutes of application, followed by shampooing.

EXAMPLE 2

The following mixture is prepared:

Irgalan Brown 7 RL (Geigy)—C.I. Acid Brown 47, Color Index, 2d ed., 1956, p. 1347 _____ 0.6
Butyl Cellosolve _____ 7
2-phenoxyethanol _____ 1.2
Water, q.s.p. 100 cc.
pH 3.

This mixture, when applied to originally chestnut hair, now 80% white, left 20 minutes, and then washed off imparts a mahogany tone thereto.

EXAMPLE 3

The following mixture is prepared:

Vialon Fast Brown R (B.A.S.F.)—C.I. Acid Brown 50, Color Index, 2d ed., 1956, p. 1349 _____ 0.5
Butyl Cellosolve _____ 5
2-phenoxyethanol _____ 1
Water, q.s.p. 100 cc.
pH 3.

This mixture, when applied to 90% white hair, and left for 20 minutes produces a lasting gray with a slightly mauve glint.

EXAMPLE 4

The following mixture is prepared:

Vialon Fast Brown R (B.A.S.F.)—C.I. Acid Brown 50 _____ 0.5
Butyl Cellosolve _____ 7
2-phenoxyethanol _____ 1.2
Water, q.s.p. 100 cc.
pH 3.

This mixture, when applied to 90% white hair and left for 20 minutes, produces a long lasting greenish gray.

EXAMPLE 5

The following mixture is prepared:

| | |
|---|---|
| Vialon Fast Brown R (B.A.S.F.)—C.I. Acid Brown 50 | 0.5 |
| Ethyl glycol acetate | 6 |
| 2-phenoxyethanol | 2 |
| Water, q.s.p. 100 cc. | |
| pH 3. | |

This mixture, when applied to 90% white hair and left for 20 minutes produces a long lasting smoky gray.

EXAMPLE 6

The following mixture was prepared:

| | |
|---|---|
| Direct Brown C.I. 420 | 0.5 |
| 2-phenoxyethanol | 4 |
| Water, q.s.p. 100 cc. | |
| pH 3. | |

This mixture when applied to cotton, wool and silk produced a brown color.

It will be appreciated that while the basic object of the invention is to provide a way of dyeing hair or other keratinic fibers with direct dyes having little or no affinity for such fibers, it is possible to use other direct dyes having some affinity for keratinic fibers, since in this case the process assists and accelerates the "taking" of the dye and at the same time fixes it more firmly to the fiber.

In general, any direct dye may be used. Illustrative direct dyes that may be used include the nitrated colorants such as methyl-isopicramic acid and 1-hydroxy-2-amino-5-nitro-benzene; azo dyes, anthraquinone dyes, insoluble pigments, etc. More specific dyes include Alkali Yellow R C.I. No. 426, Azo Blue C.I. No. 463, Benzoazurine G C.I. No. 502, Brilliant Yellow C.I. 364, Cachou de Laval C.I. 933, Direct Green B C.I. 593, Direct Yellow C.I. 620, Erika B C.I. 130, Phosphine C.I. 793, etc.

What is claimed is:

1. A method of dyeing live human hair which comprises applying thereto, in amounts sufficient to dye said hair, a hair dye composition comprising an aqueous solution of a hair coloring amount of a direct dye selected from the group consisting of an azo dye, a basic dye and a nitro dye, 0.5 to 8% by weight of said composition of 2-phenoxyethanol and 3.5 to 12% by weight of said composition of ethyl glycol acetate.

References Cited

UNITED STATES PATENTS

| | | | |
|---|---|---|---|
| 2,049,657 | 8/1936 | McQueen et al. | 8—63 |
| 2,923,593 | 2/1960 | Olpin et al. | 8—93 X |
| 2,983,651 | 5/1961 | Seemuller | 8—10.1 |
| 2,992,878 | 7/1961 | Studer | 8—63 |
| 3,632,290 | 1/1972 | Tucker | 8—10.1 |

ALBERT T. MEYERS, Primary Examiner

V. C. CLARKE, Assistant Examiner

U.S. Cl. X.R.

8—10, 92, 93